United States Patent [19]

Scheffler

[11] 4,134,250

[45] Jan. 16, 1979

[54] PNEUMATIC APPARATUS AND PROCESS FOR HARVESTING FRUIT

[75] Inventor: Edward D. Scheffler, Coloma, Mich.

[73] Assignee: Ag Superior, Inc., Riverside, Mich.

[21] Appl. No.: 824,712

[22] Filed: Aug. 15, 1977

[51] Int. Cl.$^2$ .............................................. A01D 46/24
[52] U.S. Cl. ....................................... 56/328 R; 56/30
[58] Field of Search ..................... 56/328 R, 329, 330, 56/30, 31, 32; 239/210, 225, 177, 243, 245, 246, 263, 265, 536

[56] References Cited

U.S. PATENT DOCUMENTS

| | | | |
|---|---|---|---|
| 3,006,131 | 10/1961 | McDowell | 56/330 |
| 3,114,998 | 12/1963 | Weisser | 56/329 |
| 3,310,231 | 3/1967 | Wininger et al. | 56/328 R |
| 3,448,567 | 6/1969 | McGee | 56/328 R |
| 3,455,502 | 7/1969 | Pool et al. | 56/328 R |
| 3,690,053 | 9/1972 | Thorn | 56/328 R |
| 3,757,504 | 9/1973 | Rauth | 56/328 R |
| 3,871,040 | 3/1975 | Marasco | 56/328 R |
| 3,943,688 | 3/1976 | Billings | 56/328 R |
| 4,078,365 | 3/1978 | Ingalls | 56/328 R |

Primary Examiner—Louis G. Mancene
Assistant Examiner—Paul J. Hirsch
Attorney, Agent, or Firm—Gordon W. Hueschen

[57] ABSTRACT

Apparatus and process is provided in which a blast of air is impinged on a fruit-bearing limb grouping to cause it to bend, preferably downwardly, and thereafter cause a second blast of air to impinge on the bent-limb grouping in the opposite direction. Advantageously, the two blasts of air move in unison laterally along and around the tree with the first blast being ahead of the second blast and with the spacing between the two blasts being correlated with the rate of transverse movement so that, as soon as the first blast of air passes the limb grouping which is bent down, the second blast of air impinges on said grouping from beneath, in a manner to reinforce the natural rebound of the limb, whereby the normal whiplash effect which takes place on the rebound of the limb grouping is enhanced. In one form of the invention, the means for directing the blasts is stationary except for the transverse movement. In another form, it is adapted to rotate about a common center as a rotating unit, which in turn is adapted to rotate about a second common center which is fixed except for said transverse movement.

30 Claims, 13 Drawing Figures

U.S. Patent   Jan. 16, 1979   Sheet 1 of 5   4,134,250
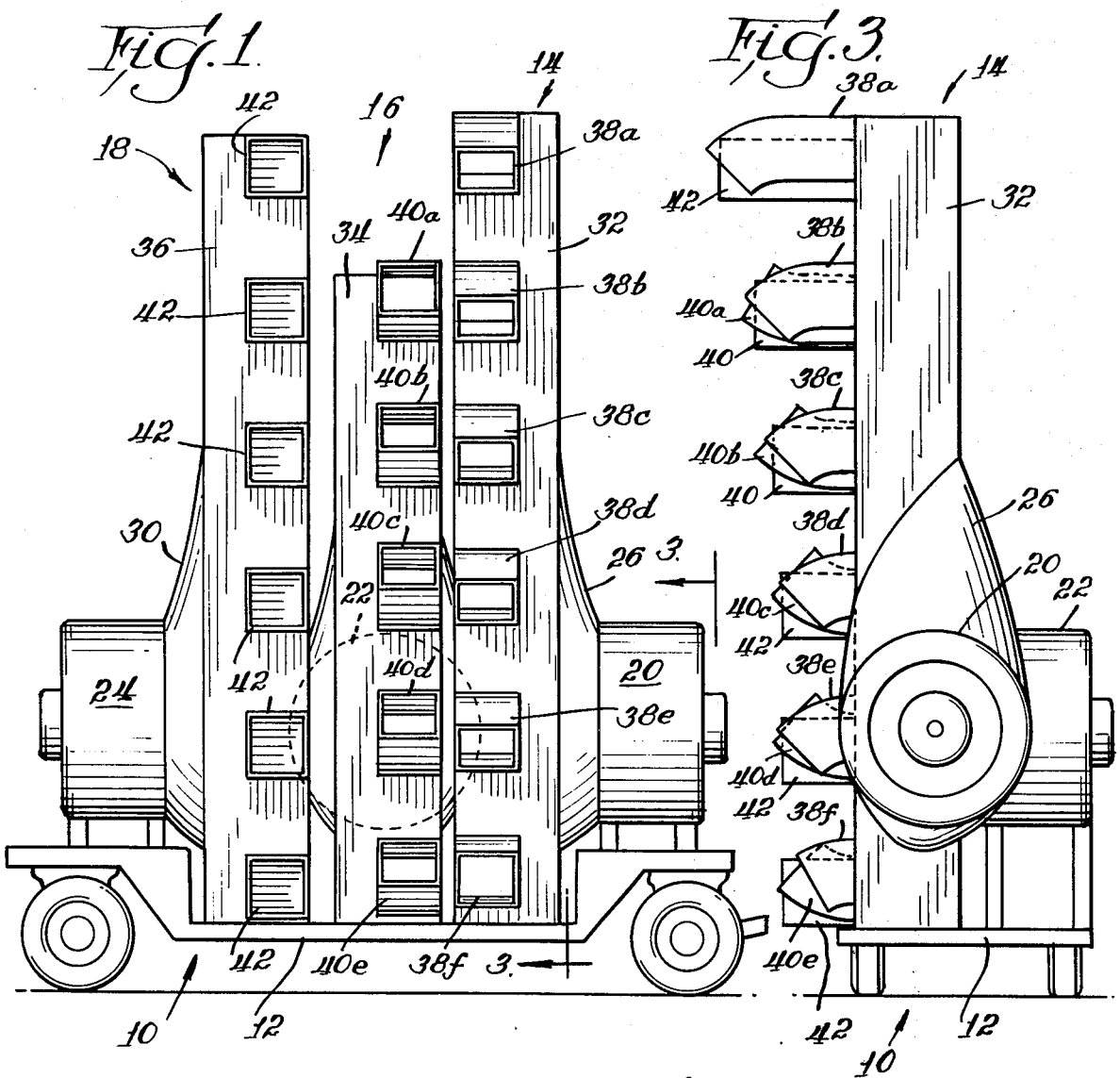
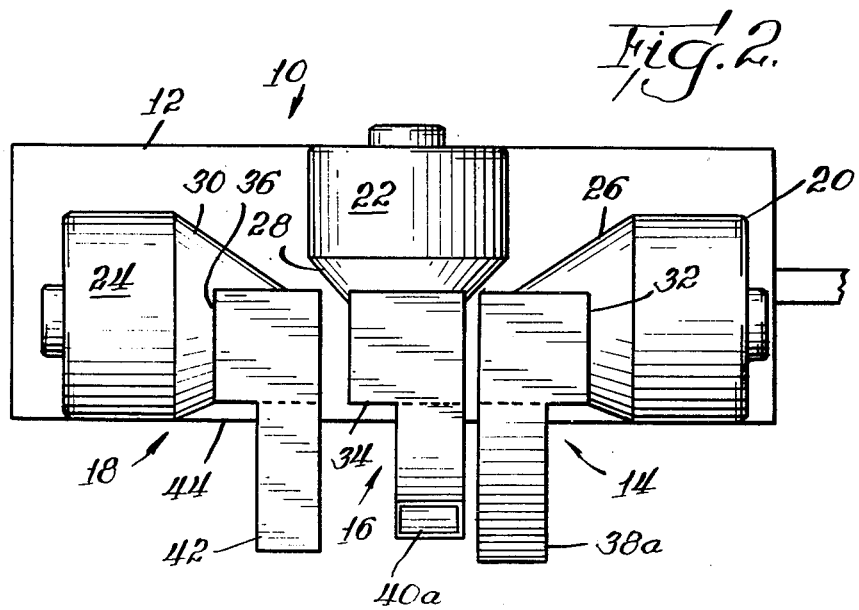

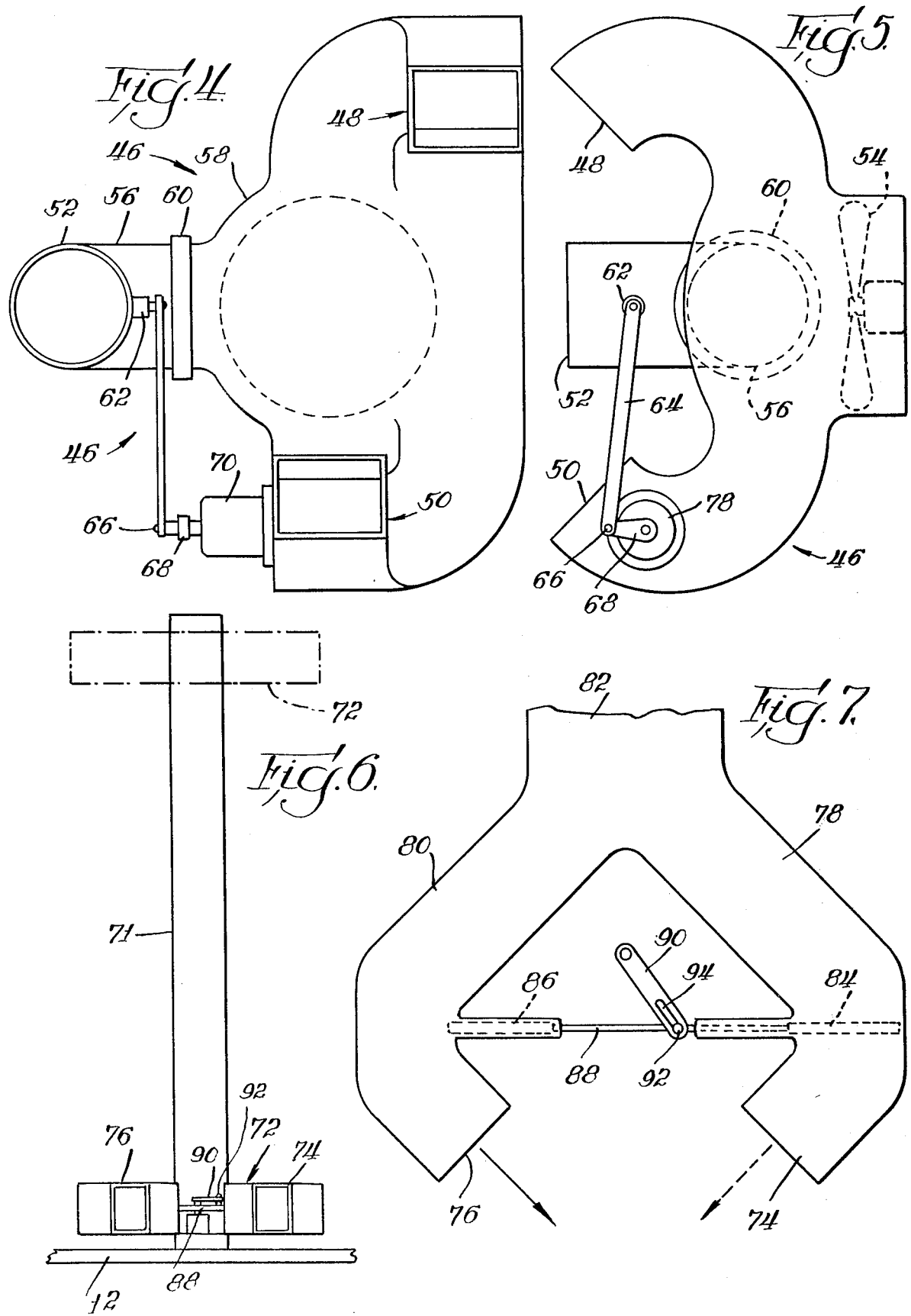

PNEUMATIC APPARATUS AND PROCESS FOR HARVESTING FRUIT

BACKGROUND OF THE INVENTION

Field of Invention and Prior Art

This invention relates to harvesting apparatus and process and is particularly directed to apparatus and process for harvesting fruit from fruit-bearing trees.

With the development of abscission-promoting materials such as ACTI-AID$^{TM}$, mechanical harvesters designed to shake the limbs of a tree have been developed. Effective such mechanical harvesters are provided with means for causing blasts of air to impinge on fruit-bearing limbs to set them in motion to shake the fruit from the limbs. U.S. Pat. No. 3,943,688, for example, discloses a harvesting machine of the class described with louvers adapted to direct air blasts upwardly or downwardly either in unison or in non-unison. Also, U.S. Pat. No. 3,871,040 discloses a harvester for directing pulsating jets of compressed air into the tree. U.S. Pat. No. 3,757,504 discloses parallel vertical columns having means therein to direct blasts of air toward the center of the tree with means to cause the air to be directed upwardly or downwardly in a random manner for the height of each column. U.S. Pat. No. 3,310,231 is similar to U.S. Pat. No. 3,943,688, but uses the means of U.S. Pat. No. 3,757,504 for causing the blast or jet of air to be directed upwardly or downwardly in a random manner.

U.S. Pat. No. 3,114,998 discloses a harvesting means for directing jets of air downwardly, sideways, and upwardly into the tree, and U.S. Pat. No. 3,455,502 discloses means for directing a high-velocity blast of air into the top of the tree to knock the fruit therefrom into a wagon.

Still another harvester which employs a pulsating air blast to remove oranges that have been treated with an abscission chemical, is disclosed in *The Citrus Industry*, Vol. 57, August 1976, page 15. Three fans are stacked vertically and are powered in a way, not shown, to produce a pulsating air blast.

The prior art does not disclose the salient features of this invention, which will be described more particularly below, of causing a blast of air to impinge on a fruit-bearing limb grouping, that is, one or more limbs affected by the blast of air, to cause the limb grouping to bend, and thereafter causing a blast of air from the opposite direction to impinge on the limb grouping while it is still bent as a result of the first blast of air.

OBJECTS OF THE INVENTION

It is an object of the invention to provide new and improved apparatus and process for the air-harvesting of fruit. It is a further object of the invention to provide such apparatus and process in which oppositely directed air blasts are caused successively to impinge upon a limb grouping in such a manner that the first blast causes the limb grouping to bend and the second blast impinges on the limb grouping while it is still bent from the first air blast and enhances or accelerates the rebound of the bent-limb grouping. It is a further object of the invention to provide apparatus and process of the class described which has improved efficiency. It is a further object of the invention to provide apparatus and process of the class described in which more fruit is recovered per unit of power expended. It is a further object of the invention to provide apparatus and process of the class described which avoids the disadvantages of the prior art and to obtain such advantages as will appear as the description proceeds.

BRIEF DESCRIPTION OF THE INVENTION

The invention relates to apparatus and process for harvesting fruit from trees in which a blast of air is caused to impinge on a fruit-laden limb grouping until said limb grouping is bent, the air blast is stopped from impinging on the bent limb grouping sufficiently for at least one bent limb to be free to rebound, a second blast of air is then caused to impinge on the bent-limb grouping from the opposite direction, and the second blast of air is timed to impinge on the bent-limb grouping while it is still bent as a result of the first blast of air having impinged thereon. As a result, the tendency to rebound of any bent limb in the bent-limb grouping which is free to rebound is augmented by the second blast of air from the opposite direction.

Advantageously, the timing is such that the second blast of air impinges on the bent-limb grouping at or before at least one limb thereof has begun to rebound. In this way, the normal whiplash which takes place on the rebound of the limb is enhanced and fruit still clinging to the limb is popped off.

It is of advantage to have the blast of air impinge on successive limb groups in succession so that, as the first blast of air impinges on a successive limb grouping, the second blast of air will be impinging on the first limb grouping.

It is of advantage, also, to have the first blast of air directed downwardly and the second blast of air directed upwardly. In this way, the first blast of air is directed on a limb which is already bent downwardly by the weight of the fruit thereon and causes it to bend still further, and when it is bent as far as it will go and the first blast is no longer impinging thereon, the second blast catches from below while it is still bent from the first air blast having impinged thereon.

It is of advantage to have the air blasts move in unison across the foliage expanse of the tree. In this way, the air blasts will be directed at successive limb groupings in sucession. The cross movement may be up or down or transverse or a combination of such movement. In this form of the invention, the first air blast producing means is displaced laterally in the direction of movement and the second air blast producing means is displaced laterally in the direction opposite to the direction of movement and the displacement or spacing is so correlated with the rate of cross movement that the second blast of air impinges on each bent successive limb grouping after said first blast of air has moved to an adjacent limb grouping.

In accordance with one form of the invention, the first and second air blasts are mounted to rotate as a unit about a common center, in which case, the rate of rotation is so correlated with the limb groupings that, as the first air blast-producing means moves from one limb grouping to an adjacent limb grouping, the second air blast-producing means will have moved in the opposite direction in time to catch the bent-limb grouping while it is still bent from the first air blast having impinged thereon.

In accordance with another form of the invention, the center, about which said air blast-producing means rotates, can be mounted for either transverse or vertical movement, or movement about the circumference of a circle which would impart both vertical and transverse components to the movement and, if desired, the whole can be mounted on a mobile base for transverse movement along a row of trees or about a tree so that a series of three different types of movement are impressed one upon the other in an epicyclic structure.

The term "epicyclic" as used here is in accordance with definition 1-b of *Webster's New Third International Dictionary*, G. & C. Merriam Co., Springfield, Mass., USA (1963), as follows: "a process or activity going on within the context of a larger one". In this case, the process or activity is movement. Thus, an epicycle obtains when the first movement is impresed upon the second movement and an epiepicycle obtains when these two movements are impressed upon the third, for example, when the rotating movement of the rotating unit is impressed upon the rotating movement of the centers of said rotating units and the whole is impressed on the transverse movement along a row of trees.

In a preferred form of the invention, the rate, at which the air blast-producing means rotate about the first common center, is the same as the rate at which their common center rotates about a second common center. This results in the orientation of the rotating units always being the same relative to the trees. Thus, if the first air blast-producing means is at the top of the rotating unit and the second air blast producing means is at the bottom, this orientation will be maintained throughout the cycle of the rotating units about the second common center. Now, if a transverse motion is impressed upon this epicycle, the air blast-producing means will traverse the foliage expanse of the tree in a circular path if the two rates of rotation are the same. If they are not the same, the traverse will be in an epicyclic path. When the two rates of rotation are the same and the orientation of the air blast is vertical, the upper one will be displaced in the direction of transverse movement and the second will be displaced in the opposite direction, thus providing the spacing which cooperates with the transverse movement to move the second air blast-producing means in under the bent-limb grouping after the first air blast-producing means has moved off of it.

In accordance with a preferred form of the invention, the plurality of units of the first and second air blast-producing means are stacked in a vertical column mounted on a mobile base for transverse movement. Each air blast-producing means is oriented to direct its air blast into the tree in a plane which is normal to the direction of transverse movement and each unit, preferably, is oriented so that the first air blast-producing means is at the top of the unit and the second air blast-producing means is at the bottom of the unit. The first air blast-producing means, advantageously, is oriented to direct its blast inwardly at an angle toward the second, and vice versa, and the spacing between the two is such that when the first blast causes a limb grouping to bend, the air blast from the second will impinge on the opposite side of the bent-limb grouping and thus give it a boost and enhance its rebound. In this modification, the first air blast-producing means is displaced in the direction of the transverse movement relative to the second air blast-producing means just enough so that the time elapsed in the transverse movement from one position to the other is just enough for the second air blast-producing means to move in under the bent-limb grouping before it has begun its natural rebound.

In this form of the invention, the first air blast-producing means may comprise a series of nozzles projecting downwardly from a plenum at an angle of about 45 degrees, plus or minus about 15 degrees, preferably adjustable over that range, which plenum is supplied with compressed air by a suitable blower. The second air blast-producing means, similarly, can be a plurality of oppositely directed nozzles projecting from a second plenum parallel to the first and juxtaposed thereto with the nozzles projecting upwardly at an angle of 45 degrees, plus or minus about 15 degrees, and also adjustable over that range. This plenum, too, will be supplied with compressed air by a blower. Advantageously, the lowermost nozzle in the first plenum is directed straight in, but may be bent downwardly at a small angle, say, about 30 degrees or less, and will function to direct air into the bottom limbs of the tree. It also can be adjustable over this range. The plenums are mounted on a trailer or other mobile vehicle with the nozzles oriented in a plane perpendicular to the direction of movability of the vehicle so that, when the vehicle is pulled up alongside the tree, the blast of air from the nozzles will be directed inwardly toward the center of the tree; the first blast being directed inwardly and downwardly, and the second blast being directed inwardly and upwardly. Preferably, the two blowers are independently controlled, advantageously, by hydraulic motors so that, when desired, air at a greater velocity, or in a greater volume, can be discharged from one or the other plenums. Advantageously, the size of the orifices on the second plenum will be larger than those on the first so that a greater volume of air can be directed upwardly against the bent-limb groupings. This is sometimes of advantage over increasing the velocity because, at too high velocity, a blow-through effect is sometimes obtained.

Advantageously, a third plenum can be mounted on the vehicle some distance after the second in order that blasts of air can be directed into the center of the tree after fruit has been knocked off by the blast from the first two plenums. This makes it possible to clean up fruit in or near the center of the tree which was not affected by the blast from the first two plenums. Advantageously, the nozzles of the third plenum are also oriented in a plane transverse to the direction of movability of the vehicle so that they too direct the blast of air in toward the center of the trees. Also, it is of advantage to have the nozzles moveable up and down through a suitable angle, say, of 45 degrees each way, or so, and to provide means for alternately moving the nozzles from one position to the other.

In accordance with another form of the invention, two nozzles are supplied from a single source of compressed air, one of which is oriented to function as the first air blast-producing means and the second of which is oriented to function as the second air blast-producing means, and means is provided for shuttling air from the common source from one nozzle to the other. Thus, the air will be directed into the first air blast-producing means until the limb is bent down, then it will be shunted to the second air blast-producing means where it will be discharged through the nozzle in time to catch the bent-limb grouping while it is still bent from the effect of the first blast.

These intermittent units can be mounted for vertical or transverse movement, or both, and also may be mounted with the two nozzles in a vertical plane or in a horizontal plane. When in the horizontal plane, they will function to cause the limb groupings to move back and forth sideways and, when in the vertical plane, they will cause the limb groupings first to move downwardly and then upwardly. Whether mounted in a vertical plane or a horizontal plane, they can be mounted on an elevator to move them up and down and thus traverse the vertical expanse of the tree. They can also be mounted horizontally or transversely. In that case, the epicycle is a saw-toothed path. When mounted to move both transversely and vertically, several such units can be mounted in tandem to give effective coverage of the foliage expanse of the tree.

In this modification, the shunting of the air blast from one nozzle to the other can be effected by a rotary valve, by a flip valve, or by two gate valves connected together so that one is open when the other is closed and vice versa.

BRIEF DESCRIPTION OF THE DRAWINGS

In The Drawings:

FIG. 1 is a face view of one form of the invention.
FIG. 2 is a plan view of FIG. 1.
FIG. 3 is a side view of FIG. 1.
FIG. 4 is a face view of another form of the invention.
FIG. 5 is a side view of FIG. 4.
FIG. 6 is a face view of still another form of the invention.
FIG. 7 is a schematic detail view of a unit of FIG. 6.

DETAILED DESCRIPTION OF THE INVENTION

Figure 8:
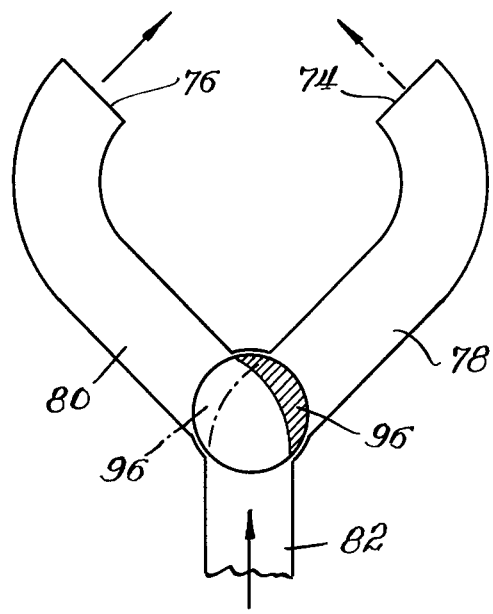
FIG. 8 is a modified form of FIG. 7.

In FIGS. 1, 2, and 3 there is shown a preferred form of the invention in which apparatus in accordance with the invention is mounted on a trailer 10 adapted to be pulled by a tractor, not shown. The trailer 10 has an underslung base 12 to provide a minimum ground clearance. Mounted on the underslung base 12 are three vertical plenums 14, 16, and 18, which are connected, respectively, to blowers 20, 22, and 24 which are mounted on base 12 of the trailer. The discharge outlets of the blowers 20, 22, and 24 are connected to the plenums 14, 16, and 18, respectively, by conduits 26, 28, and 30, respectively, which extend up to about the midportion of the plenums so that effective distribution of air from the blowers into the plenums is obtained. The faces 34, 36, and 38 of the respective plenums 14, 16, and 18, which face to the side of the trailer 10, are provided with a plurality of nozzles 38, 40, and 42 for directing blasts of air from the several nozzles into the foliage of the tree alongside of which the trailer is pulled.

The nozzles 38, 40, and 42 extend beyond the side edge 44 of the base 12 so that, when the trailer is drawn alongside a tree, the nozzles will project into juxtaposition with the foliage of the tree so that the blasts of air produced by the nozzles will be directed into the foliage of the tree in a manner which will be more particularly described.

The nozzles in the respective plenums are oriented so that the nozzles 38 direct the blast of air downwardly, whereas the nozzles 60 are oriented to direct the blast of air upwardly. Advantageously, the orientation is such as to direct the air either upwardly or downwardly, as the case may be, at an angle of about 45 degrees, although, it is understood that this angle may be more or less, as desired. For reasons which will appear as the description proceeds, it is advantageous if the angle at which the nozzles direct the air upwardly or downwardly is not greater than about 60 degrees and not less than about 30 degrees.

The nozzles 38 and 40 work together in pairs, indicated as 38a and 40a, and 38b and 40b, and so on. As the tractor pulls the trailer alongside the tree, the nozzle 38 will direct an air blast downwardly on a limb grouping on that tree and then will move to the next adjacent limb grouping in the direction of travel, and in that time, the nozzle 40b will have moved in under that same limb grouping. Thus, the blast of air from the nozzle 38a acts to cause the limb grouping to bend downwardly and, when a blast of air from nozzle 38a is removed from that limb grouping, before the limb grouping can rebound, the blast of air from the nozzle 40a will have moved in under that bent-down limb grouping so that the blast of air from the nozzle 40a will give the limb grouping a boost and augment its natural rebound. This occurs also with the b, c, d, and e pairs. Since, however, there is no upwardly-directed nozzle which pairs off with nozzle 38f, it is of advantage to have the blast of air from this nozzle go more directly into the foliage. To this end, the angle of this nozzle is less than that of the other nozzles 38. Advantageously, it is directed straight in but, if desired, it can be angled downwardly as much as about 30 degrees. Advantageously, it may range from about zero degrees to about 30 degrees.

The transverse spacing between the nozzles 38 and 40 is in accordance with the natural period of the limb groupings of the tree. When a limb grouping is bent down and released, it will rebound and oscillate back and forth in a natural period according to the length of the limbs, much like a pendulum. The transverse spacing between the nozzles 38 and nozzles 40, accordingly, must be so correlated with the rate of travel that the nozzles 40 are underneath the bent-down limb groupings while the limb groupings are still bent from the air blasts from the nozzles 38.

Advantageously, the transverse spacing is so correlated with the rate of travel that the nozzles 40 move in under the successive bent-down limb groupings before they have started their natural rebound. Optimally, the timing is such that the upward blast of air catches the bent-down limbs at their nadir. In this way the whiplash effect, which occurs as the limbs start to rebound, is enhanced by the blast of air, reinforcing the rebound. Thus, the downwardly directed blast of air hits the top of the limbs and knocks the limbs down and, immediately thereafter, the upwardly-directed blast of air hits the bent-down limbs from underneath and knocks them up. The fruit-laden limb groupings of the tree are thus given a one, two-type punch in quick succession so that the limb grouping is given that added impetus upwardly on the rebound which is effective to dislodge even the more difficult to remove fruit.

The nozzles 42 and plenum 18 are spaced far enough behind the nozzles 40 for the nozzles 38 and 42 to finish their work in knocking off the fruit. This opens up the tree for the blast of air directed from the nozzles 42 to penetrate far into the tree to reach any fruit which has not been knocked off by the nozzle groups 38-40.

All of the nozzles, 38, 40, and 42 can be adjustable. Thus, the nozzles 38 can be adjustable to increase or decrease the angle at which they are directed downwardly, nozzles 40 can be made ajdustable so that the angle at which they are directed upwardly can be adjusted, and nozzles 42 can be adjusted to direct the blast of air directly in, or upwardly, or downwardly. Also, the nozzles 42, by suitable means as will be discussed hereinafter with FIGS. 4 and 5, can be provided with means for alternating them back and forth from the up to the down position.

If desired, the topmost nozzles, for example, 38a and 38b, may project out farther than the nozzles below in order to conform to the natural configuration of the trees. Thus, in trees where the foliage tends to recede nearer the top, it is desirable to have the top-most nozzles project further out to compensate. In well-tended orchards, especially those where the trees are topped, this modification may not be necessary or desirable.

Thus, in accordance with this modification of the invention, when the trailer 10 is pulled alongside a row of trees with the nozzles in juxtaposition to the foliage of the trees, the blasts of air from the nozzles 38 will cause all the limb grouping in a vertical plane to bend downwardly and, as the trailer traverses the orchard, these nozzles will pass onto successive limb groupings in succession. Concomitantly therewith, the nozzles 40 will move under the bent-down limb groupings in succession in time to give an impetus to the rebound of such bent-down limb groupings. Thus, when the limb groupings are bent down from the blasts of air from the nozzles 38 and are freed to rebound as the blast from the nozzles 38 pass onto an adjacent limb grouping, the air blasts from the nozzles 40 catch the bent-down groupings from beneath and give them an upward thrust which enhances the natural rebound of the limb groupings. Then, following this action, the blasts from the nozzles 42 penetrate deeply into the tree and tend to knock off any fruit which has not been knocked off by the first two blasts.

In FIGS. 4 and 5, there is shown a modified form of the invention in which a single fan-driven unit 46 is shown.

The unit 46 comprises a downwardly directed nozzle 48, an upwardly directed nozzle 50, and an inwardly directed nozzle 52, which correspond, respectively, to nozzles 38, 40, and 42 of FIGS. 1, 2, and 3. These units are adapted to be mounted on a mobile base for transverse movement, as in FIG. 1, and the transverse spacing between the nozzles is that observed in connection with FIGS. 1, 2, and 3. Two or more units can be stacked in a vertical plane so that the net effect will be essentially that of the modification shown in FIGS. 1, 2, and 3.

Each unit of FIGS. 4 and 5, however, is powered by an individual blower 54 so that more air can be directed into the top of the tree, or to the bottom, as may be indicated according to the particular orchard involved. The nozzle 52 is shaped like an elbow with one end 56 attached to the fan housing 58 by a joint 60, which permits the nozzle leg 52 to be rotated up or down to direct the air either upwardly or downwardly. The orifice leg of the nozzle 52 is pivoted at 62 to a link 64 which is pivoted at 66 to crank 68 which is driven by a motor 70. Thus, motor 70 operates to cause the nozzle to oscillate back and forth from the upwardly directed position to the downwardly directed position. Similar means can be applied to the nozzles 42 of the plenum 18 to cause them to alternate between the up and down positions.

In FIGS. 6 and 7, there is shown another form of the invention. In FIG. 6 there is shown mounted on the mobile base 12, an elevator 70 adapted to move the unit 72 up and down between the position shown in solid lines near the base 12 to the position shown in dotted lines near the top of the elevator. The unit 72 is provided with one nozzle 74 and a second nozzle 76 opposed to the first. Each of the nozzles 74 and 76 is bent inwardly so that the blast of one is directed toward the other, and vice versa. Means is provided, as will be described, for causing the air blasts to alternate between nozzles 74 and 76 so that the first blast of air causes a limb grouping to move away from it and the second air blast catches that limb grouping while it is still bent from the first air blast and causes it to move back toward the first nozzle. If the unit is held in the same place, the limb grouping can be shaken back and forth, but normally it will be moved by the elevator 70, or by the transverse movement of the base 12, or by both, from one limb grouping to the next.

The spacing between the nozzles 74 and 76 is determined by the normal sweep of the limb groupings and is such that, when the limb grouping is bent to the left by nozzle 74, the nozzle 76 will be in position to direct its blast of air against the opposite side of the bent-limb grouping. Alternating of the blasts of air from nozzle 74 to nozzle 76, and so on, is timed either by hand or mechanically in accordance with the period of the limb groupings so that the blast from the nozzle 76 impinges on the opposite side of the bent-limb grouping while it still bent from the blast of air from nozzle 74 and, preferably, either at or before it has begun its natural rebound.

It will be observed that, as a result of the vertical movement up and down, the elevator 70 and the transverse movement of the mobile base 12, the nozzles 74 and 76 will traverse a saw-tooth path as a result of the up and down motion having been impressed on the transverse motion. The path of the nozzles, therefore, is epicyclic.

It will be understood that unit 72, instead of being oriented in the horizontal position, as shown, can be oriented in a vertical position so that the top-most nozzle will cause a limb grouping to bend downwardly and the lowermost nozzle will cause it to bend upwardly. In such case, the orientation will be similar to that of FIGS. 1, 2, and 3, except that, since the air blasts from the two nozzles alternate, it will not be necessary to have the top nozzle displaced with respect to the bottom nozzle in the direction of travel.

It will be understood that a plurality of elevators 70 can be mounted in tandem relation on the mobile base 12, in which case it is desirable to have the units of the several elevators move in unison so that the units of one elevator do not traverse the path taken by the units of a preceding elevator.

In FIG. 7 there is shown a schematic drawing of suitable valve means for effecting alternation of air blasts from the nozzles 74 and 86. Thus, conduits 78 and 80, which supply air to the nozzles 74 and 76 from a common source 82, are provided with gate-type valves 84 and 86 tied together by rod 88 which is actuated by lever 90 having a pin and slot connection 92 and 94. Thus, when the lever 90 is thrown to the right, the gate valve 84 will close the conduit 78 and open conduit 80 and, when it is thrown to the left, the reverse action takes place. The air from the common source 82 is alternately channeled through conduit 78 and 80 and, respectively, to nozzles 74 and 76.

Figure 9:
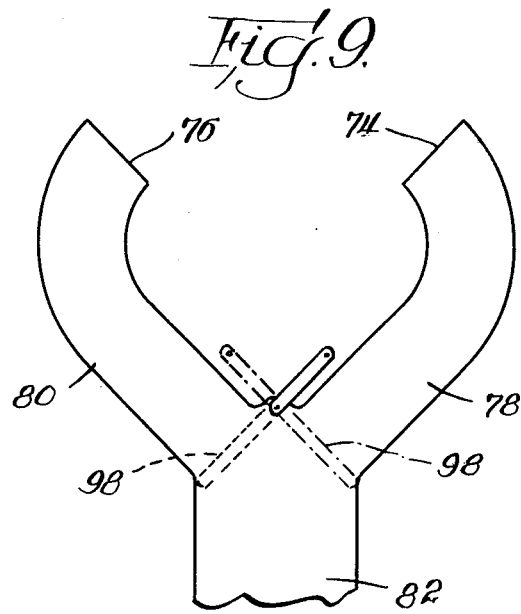
FIG. 9 is a modified form of FIG. 7.

FIGS. 8 and 9 show modifications of FIG. 7. In FIG. 8, a rotary valve operates to alternate the flow of air to conduits 78 and 80, and in FIG. 9, a flip valve 98 accomplishes the same purpose.

Figure 10:
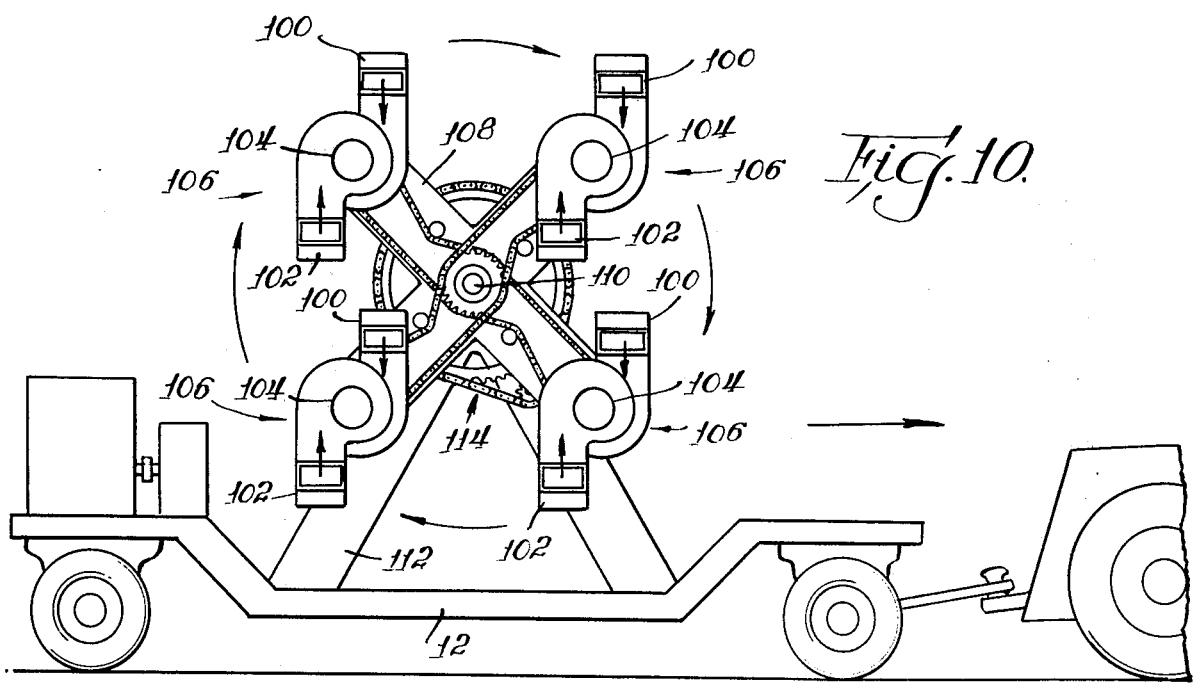
FIG. 10 is still another modified form of the invention.

In FIG. 10 there is shown a still further modification of the invention in which the nozzles 100 and 102 are mounted to rotate about the common axis or center 104. The common axes 104 are journaled at the end of the arms of a spider 108 and the spider 108 is mounted for rotation about a second common means 112 mounted on the support base 12. A chain and sprocket-type drive means 114 is provided for causing the spider 108 to rotate about its axis 110. Means, not shown in this figure but which will be described in FIGS. 11, 12, and 13, also cause the rotating units 106 to rotate about their axes 104 at the same rate that the spider 108 rotates about its axis 110. Thus, the orientation of the nozzles 100 and 102, in each rotating unit 106, is maintained constant.

As the mobile base 12 traverses the direction indicated, the nozzles 100 move onto successive limb groupings in succession and the nozzles 102 move under bent-down limb groupings in succession in the manner already described. The difference here, however, is that as the mobile base travels, the nozzles 100 and 102 sweep across the bottom of the tree, up along one side, across the top in the other direction, and down along the other side, so that the full area of the tree from top to bottom is covered. In this form of the invention, the spider can rotate either clockwise or counterclockwise but, if it rotates clockwise, the rotating unit should rotate clockwise, and vice versa.

In the broader aspects of the invention, it is possible to have the rotating units rotate at a different speed from that of the spider and the rotation of the rotary units will in itself have the effect of moving the nozzles 100 from one limb grouping to another in succession and moving the nozzles 102 under the bent-down limb groupings from one to another in succession. In this case, the rate of rotation is correlated with the natural period of the limb grouping so that the nozzles 102 are moved in under a bent-limb grouping while that bent-limb grouping is still bent from the effects of the air blasts from the nozzles 100, in which case the rotation of the rotary units 106 will be controlled independently of the rotation of the spider 108.

Figure 11:
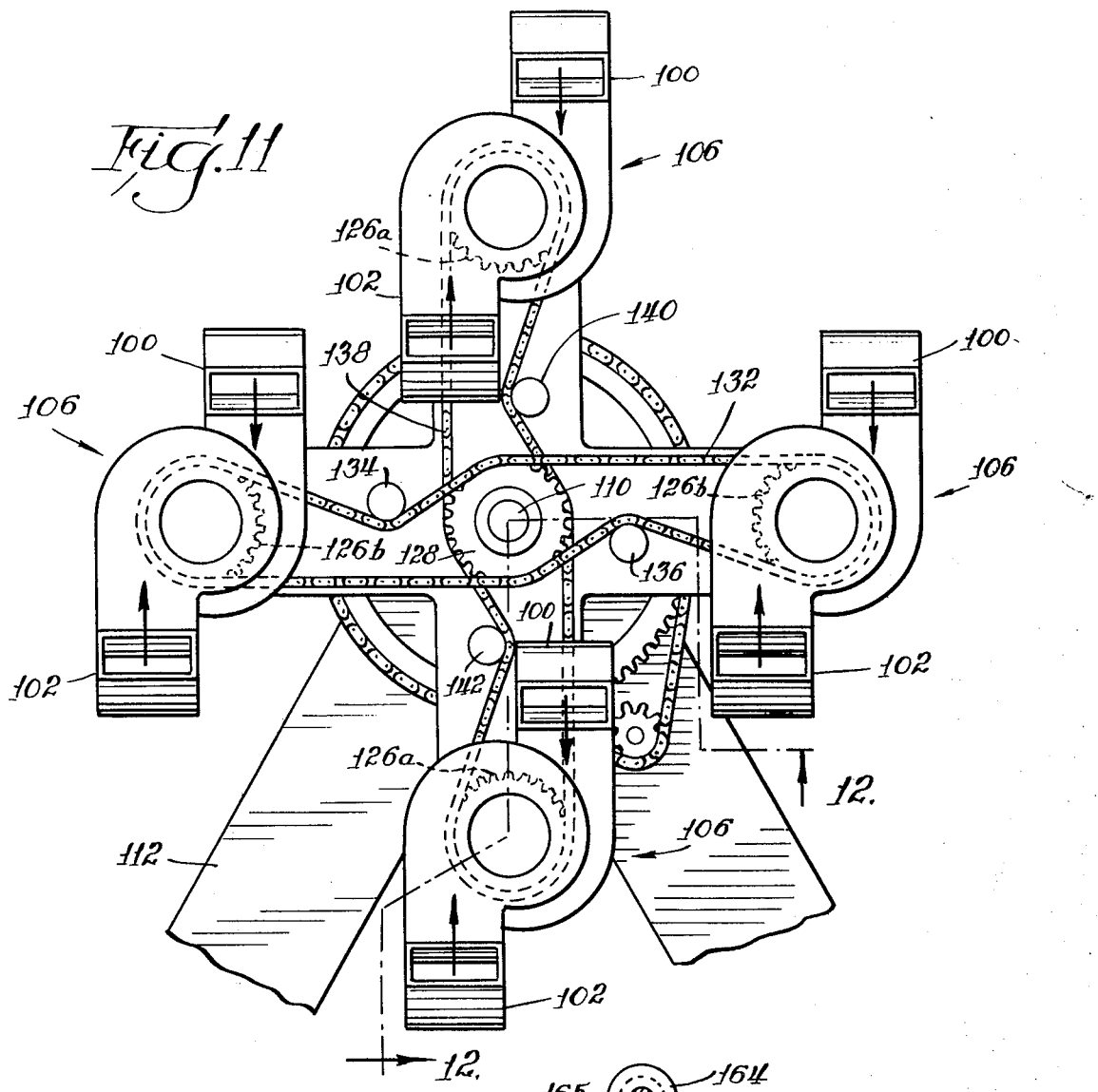
FIG. 11 is a detail view of FIG. 10.
Figure 13:
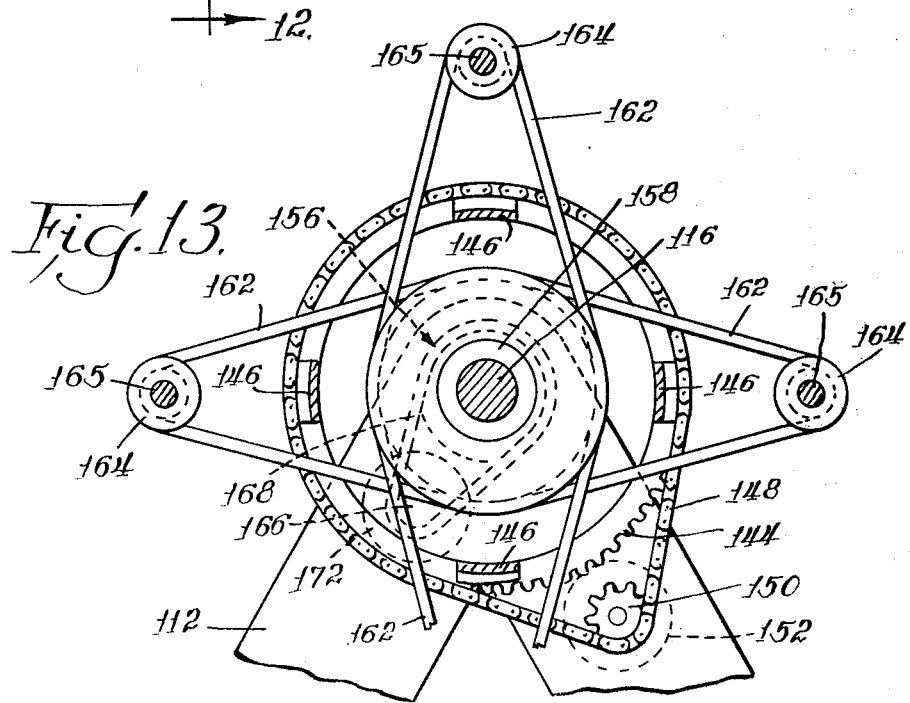
FIG. 13 is a detail view of the drives of FIG. 12 taken along line 13—13 of FIG. 12.
Figure 12:
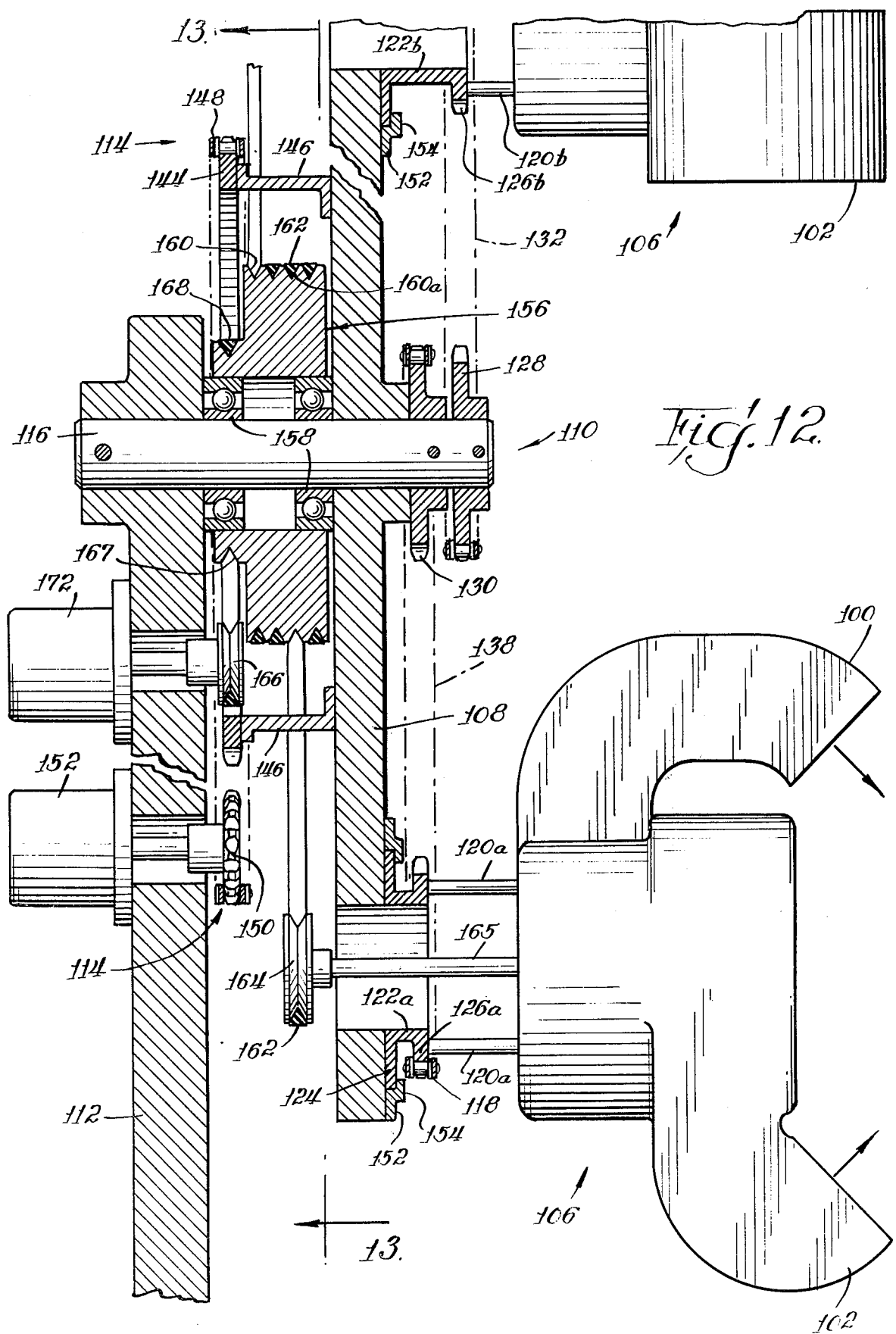
FIG. 12 is a sectional view taken along line 12—12 of FIG. 11.

It is also possible in this modification to have some, or all, of the rotating units 106 oriented with the nozzles 100 and 102 horizontal instead of vertical, as shown. In this way, a side-to-side motion can be obtained, as well as an up and down motion. If some of the units 106 are oriented one way and some the other, both up and down motions are obtained simultaneously. In FIGS. 11, 12, and 13, there are shown details of the construction of FIG. 10.

As shown in FIG. 12, the spider 108 is mounted to rotate about the stationary shaft 116 as its axis or center 110 and the rotating units 106 are each mounted on an annulus 118 by a tubular support 120. The annulus 118 comprises a central tubular portion 122, a flat annular portion 124 adapted to lie flat against the spider 108, and an annular sprocket 126 at the opposite end of the tubular portion 122. The tubular support 120 is fastened to the sprocket 126.

The length of the tubular portion 122 and the tubular support 120 varies from one pair of diametrically opposed rotating units to a pair 90 degrees displaced therefrom. Thus, the sprockets 126a line up with sprocket 128 and sprockets 126b line up with sprocket 130. Tubular portion 122a is, therefore, correspondingly shorter than tubular portion 122b and the tubular support 120a is correspondingly longer than the tubular support 120b. The overall length of the tubular portion 122 and the tubular support 120 is the same in all cases so that the rotating units 106 are uniformly spaced from the spider 108.

As best seen in FIG. 11, a continuous chain 132 encircles a pair of sprockets 126a and is held in engagement with sprocket 128 by idler sprockets 134 and 136. Since the sprocket 128 is fixedly mounted on the stationary shaft 116, it does not rotate but, as the spider rotates, there will be relative rotation between the sprocket 128 and the spider. This will impart a rotation to the sprocket 126a and cause the rotary unit 126 to rotate. If the sprocket 126a and the sprocket 128 are of the same diameter, the rate of rotation of the rotating units will be the same as the rate of rotation of the spider so that each rotary unit 106 will maintain the same orientation its traverse. Similarly, a continuous chain passes around the sprockets 126b and is held in engagement with sprocket 130 by idler sprockets 140 and 142.

The spider 108 carries a large ring sprocket 144 mounted thereon by supports 146 which sprocket is connected by chain 148 to the small sprocket 150 which is driven by a low-speed hydraulic motor 152 mounted on support 112.

The flat annular part 124 of the annulus 118 is adapted to fit into the annular collar 152 having an overlapping portion 154. Thus, the annulus 118, with its sprocket 126, is held flush against the spider 108 and yet is free to rotate with respect thereto.

Mounted between the spider 108 and the support 112 in the space provided by the support 146 and the ring sprocket 144 is a multiple sheave 156 mounted to rotate freely on the stationary shaft 116 through suitable bearings 158.

The sheave 156 has a plurality of V grooves 160 across its greater circumference adapted to receive V belts. One such groove is provided for each rotating unit. Thus, the groove 160a receives the V belt 162 which in turn is received by the V-groove pulley or sheave 164 mounted on the shaft 165 which drives the fan in the rotating unit 106. The fan in the rotating unit 106, suitably, is a multiple unit, squirrel-cage fan with separate units supplying air to each of the nozzles 100 and 102, respectively. Thus, as the sheave 156 is rotated, the pulley 164 is rotated and the fans of the rotating unit 106 are then driven by the shaft 165.

The sheave 156 has still a further V groove 167 having a smaller diameter than the V grooves 160 and is connected to the V-groove pulley 166 by belt 168. The pulley 166 is mounted on a shaft 170 of a high-speed hydraulic motor 162. The arrangement is such as to multiply the speed of shaft 172 several times. By this arrangement, coupled with the use of a high-speed hydraulic motor which is continuously variable through suitable valve control of the hydraulic fluid, the fan ma be speeded up or slowed down in order to get the necessary velocity for the purpose.

In operation of the device in accordance with the invention, the air blasts, advantageously, travel at between about 140 and about 200 miles per hour. Air blasts of much greater velocity than this are undesirable as they tend to blow through the trees and blow off foliage as well as fruit. Advantageously, the second blast, that is, the one which is caused to impinge on the limb grouping while it is still bent from the effect of the blast, is adapted to deliver greater energy to the limb grouping than the first blast. If the velocity used in the first blast is below the critical velocity, that is, that at which the trees are adversely affected, then the velocity of the second blast can be increased over that of the first blast. The increase may range from between about 7 and 10 percent greater than that of the first blast. In the case, however, that the velocity is at or near the critical volume already, in the first blast, it is not desirable to increase the velocity of the second blast. In that case, it is desirable to construct the orifices of the nozzles which produce the second blast with greater cross-sectional area so that a greater volume of air will be delivered at the same velocity. In this case, too, it is desirable to have the volume of air supplied by the second nozzles, that is, the nozzles which cause the blast of air to impinge on bent-limb groupings, increased by as much as between about 7 and 10 percent. This greater volume will impart greater energy to the bent-limb groupings and thereby produce a sharper rebound and a greater whiplash effect.

It is to be understood that the invention is not to be limited to the exact details of operation or structure shown and described, as obvious modifications and equivalents will be apparent to one skilled in the art.

I claim:

1. Apparatus for harvesting fruit from trees comprising first air blast-producing means for causing a blast of air to impinge on at least one fruit-laden limb grouping in a direction to bend said limb grouping, stopping means for stopping said blast of air from impinging on the bent-limb grouping sufficiently that at least one bent limb is free to rebound, a second air blast-producing means for causing a second blast of air to impinge on said bent-limb grouping from the opposite direction, and timing means for causing said second blast of air to impinge on said bent-limb grouping while it is still bent as a result of the first blast of air having impinged thereon, whereby the tendency to rebound of any bent limb in said grouping which is free to rebound is augmented by said second blast of air from the opposite direction.

2. Apparatus of claim 1, in which said timing means is timed so that the second blast of air impinges on said bent-limb grouping at or before at least one limb thereof has begun to rebound, whereby the normal whiplash effect which takes place on the rebound of the limb is enhanced.

3. Apparatus of claim 1, which further comprises means for causing said first blast of air to impinge on successive limb groupings in succession, and means for causing said second blast of air to impinge from the opposite direction on bent said successive limb groupings while said successive limb groupings are still bent as a result of said first blast of air having impinged thereon.

4. Apparatus of claim 3, in which said timing means is timed so that the second blast of air impinges on said bent-limb grouping at or before one limb thereof has begun to rebound, whereby the normal whiplash effect which takes place on the rebound of the limb is enhanced.

5. Apparatus of claim 1, in which said first means is oriented to direct said first blast of air downwardly onto said limb grouping, whereby said limb grouping is bent downwardly.

6. Apparatus of claim 3, in which said first means is oriented to direct said fist blast of air downwardly onto successive said limb groupings, whereby said limb groupings are bent downwardly in succession.

7. Apparatus of claim 1, in which said first and second means are adapted to deliver continuous blasts of air and are mounted for movement in unison across the foliage expanse of the tree, whereby they are directed onto successive limb groupings in succession, said first air blast-producing means being oriented in a plane which is normal to the direction of movement to direct said first air blast in toward the center of the tree in one direction, whereby the limb groupings on which said blast impinges are bent in that direction, and said second air blast-producing means also being oriented in a plane which is normal to the direction of movement to direct said blast of air in toward the center of the tree onto said bent-limb grouping from the opposite direction and from the opposite side, said first means being spaced ahead of said second means a distance so correlated with the rate of cross movement that the second blast of air impinges on each bent successive limb grouping after said first blast of air has moved to an adjacent limb grouping.

8. Apparatus of claim 7, in which the spacing between the first means and the second means is so correlated with the rate of cross movement that said second blast of air impinges on each bent said successive limb grouping at or before a limb thereof has begun to rebound, whereby the normal whiplash effect which takes place on the rebound of the limb is enhanced.

9. Apparatus of claim 8, in which the cross movement is transverse and the first blast of air is directed downwardly and the second upwardly.

10. Apparatus of claim 1, in which said first and second air blast-producing means are mounted to rotate as a rotating unit about a common center which is oriented with respect to said tree so that said air blasts sweep across the foliage expanse of said tree in a direction and at a rate so correlated with the normal period of said limb grouping such that, when the first means acts to bend said limb grouping and move on to an adjacent limb grouping, the second means will have moved in the opposite direction until it is under the bent-limb grouping in time for its blast of air to augment the normal rebound of said bent grouping.

11. Apparatus of claim 10, in which said rotating unit is also mounted to rotate as a unit about a second common center which has the same orientation with respect to said tree as the first common center, such that the movement of the air blast-producing means is impressed upon the movement of the common center thereof, the relative diameters of the first and second circles being such that said air blasts sweep from top to bottom of the foliage expanse of said tree, and the rate of rotation about the two common centers being the same, whereby the air blasts are maintained in the same relative orientation as they traverse the foliage expanse of said tree.

12. Apparatus of claim 11, in which said second common center is mounted on a mobile base adapted to move transversely with respect to said tree such that the movement of each air blast is impressed on the movement of the common center thereof and the resulting epicycle is impressed on said transverse movement.

13. Apparatus of claim 12, in which the relative orientation in said air blast-producing means is such that said first air blast-producing means is at the top of said rotating unit and displaced laterally in the direction of the transverse motion, and the second air blast-producing means is always at the bottom and displaced laterally in the direction opposite to the transverse movement.

14. Apparatus of claim 7, which further comprises a third air blast-producing means for causing a third blast of air to be directed inwardly toward the center of the tree after said second blast of air.

15. Apparatus of claim 14, which further comprises means for permitting said third air blast-producing means to alternate between an orientation in which said third blast of air is directed downwardly and one in which it is directed upwardly, and means for causing said third means to alternate from one position to the other.

16. A process for harvesting fruit from trees which comprises causing a first blast of air to impinge on at least one fruit-laden limb grouping in a direction to bend said limb grouping, stopping said blast from impinging on the bent limb grouping sufficiently that at least one bent limb is free to rebound, causing a second blast of air to impinge on said bent-limb grouping from the opposite direction, and timing said second blast of air to cause it to impinge on said bent-limb grouping while the limb grouping is still bent as a result of said first blast of air having impinged thereon, whereby the natural tendency to rebound of any bent limb in said grouping which is free to rebound is augmented by said second blast of air.

17. The process of claim 16, in which said second blast of air is timed to impinge on the bent said limb grouping at or before at least one limb has begun to rebound, whereby the normal whiplash effect which takes place on the rebound of the limb is enhanced.

18. The process of claim 16, in which, after said first blast of air has been caused to impinge on and bend said limb grouping, it is caused to impinge on and bend successive limb groupings of said tree in succession and, after said second blast of air has been caused to impinge on said limb grouping from the opposite direction, it is caused to impinge on said other limb groupings in succession whle they are still bent as a result of said first blast of air having impinged thereon.

19. The process of claim 18, in which said second blast of air is timed to impinge on said bent-limb groupings at or before they have begun to rebound, whereby the natural whip-lash effect which takes place on the rebound of the limb groupings in enhanced.

20. The process of claim 16, in which the first blast of air is directed to cause said limb grouping to bend downwardly.

21. The process of claim 18, in which the first blast of air is directed to cause said limb grouping to bend downwardly.

22. The process of claim 16, in which said first and second blasts are continuous blasts and are oriented to direct the first blast of air on a first limb grouping to bend the same in one direction and to direct the second blast of air onto the bent first limb grouping from the opposite direction and opposite side, in which said first and second blasts move across the foliage expanse of the tree in unison and are spaced with said first blast ahead of said second blast, and in which the rate of transverse movement is so correlated with the spacing that, when said first blast moves away from the bent-limb grouping and impinges on an adjacent limb grouping, the second blast will have moved to a position to impinge on said bent first limb grouping while it is still bent as a result of the first blast of air having impinged thereon.

23. The process of claim 22, in which the correlation of said spacing and said cross movement is such that said second blast of air impinges on the said bent first limb grouping at or before at least one bent limb thereof has begun to rebound, whereby the normal whiplash effect which takes place on the rebound of the limb is enhanced.

24. The process of claim 22, in which the cross movement is transverse and the first blast of air is directed downwardly and the second upwardly.

25. The process of claim 16, in which said first and second blasts of air rotate as a unit about a common center which is oriented with respect to said tree so that said air blasts sweep across the foliage expanse of said tree in a direction and at a rate so correlated with the normal period of said limb grouping that, when the first blast acts to bend a limb grouping and moves on to an adjacent limb grouping, the second blast will have moved in the opposite direction until it is under the bent-limb grouping in time for its blast of air to augment the normal rebound of said bent-limb grouping.

26. The process of claim 25, in which said rotating unit also rotates as a unit about a second common center which has the same orientation with respect to said tree as the first common center, such that the movement of the air blast-producing means is impressed upon the movement about the common center thereof, the relative diameters of the first and second said circles being such that said air blasts sweep from top to bottom of the foliage expanse of said tree, and the rate of rotation about the two common centers being the same, whereby the air blasts are maintained in the same relative orientation as they traverse the foliage expanse of said tree.

27. The process of claim 26, in which said second common center moves transversely with respect to said tree such that the movement of each air blast is impressed on the movement of the common center thereof and the resulting epicycle is impressed on said transverse movement.

28. The process of claim 27, in which the relative orientation of said air blasts is such that the first air blast is directed downwardly from the top of said rotating unit and is laterally displaced in the direction of the transverse movement, and the second blast of air is directed upwardly from the bottom of said rotating unit and is laterally displaced in the direction opposite to the transverse movement.

29. The process of claim 22, in which a third blast of air is caused to be directed inwardly toward the center of the tree after said second blast of air.

30. The process of claim 29, in which the third blast of air is alternately directed upwardly and downwardly.

* * * * *

UNITED STATES PATENT AND TRADEMARK OFFICE
CERTIFICATE OF CORRECTION

PATENT NO. : 4,134,250

DATED : January 16, 1979

INVENTOR(S) : Scheffler

It is certified that error appears in the above-identified patent and that said Letters Patent are hereby corrected as shown below:

[57] ABSTRACT, line 3; "thereafter cause" should read -- thereafter to cause --

Col. 2, line 38; "catches from" should read -- catches it from --

Col. 5, lines 33-35; the description of FIG. 13 and its contents should be separate from the description of FIG. 12 and its contents, therefore FIG. 13 should start a new line.

Col. 5, line 67; "60" should read -- 40 --

Col. 8, line 60; "86" should read -- 76 --

Col. 10, lines 21 & 22; "orientation its" should read -- orientation throughout its --

Col. 10, line 60; "ma" should read -- may --

Col. 11, lines 2 & 3; "the blast" should read -- the first blast --

Col. 12, line 2; "fist" should read -- first --

Signed and Sealed this

Seventh Day of August 1979

[SEAL]

Attest:

LUTRELLE F. PARKER

Attesting Officer    Acting Commissioner of Patents and Trademarks